(12) United States Patent  (10) Patent No.: US 6,532,267 B1
Heegard  (45) Date of Patent: Mar. 11, 2003

(54) VARIABLE RATE CONSTELLATION PRECODING

(75) Inventor: Chris Heegard, Santa Rosa, CA (US)

(73) Assignee: Alantro Communications, Inc., Santa Rosa, CA (US)

( * ) Notice: Subject to any disclaimer, the term of this patent is extended or adjusted under 35 U.S.C. 154(b) by 0 days.

(21) Appl. No.: 09/316,520

(22) Filed: May 21, 1999

(51) Int. Cl.$^7$ .......................... H04B 1/38; H04B 14/04; H03K 5/159
(52) U.S. Cl. ................. 375/253; 375/220; 375/264
(58) Field of Search .................. 375/144, 146, 375/148, 246, 253, 296, 348, 298, 261, 264, 265, 268, 220, 232, 233; 370/465, 466; 341/51; 714/792

(56) References Cited

U.S. PATENT DOCUMENTS

| | | | | |
|---|---|---|---|---|
| 5,265,127 A | * | 11/1993 | Betts et al. ............... | 375/39 |
| 5,881,108 A | * | 3/1999 | Herzberg et al. ........... | 375/296 |
| 5,923,651 A | * | 7/1999 | Struhsaker ................ | 370/342 |
| 6,101,223 A | * | 8/2000 | Betts ...................... | 375/261 |
| 6,115,415 A | * | 9/2000 | Goldstein et al. .......... | 375/222 |
| 6,167,082 A | * | 12/2000 | Ling et al. ............... | 375/233 |
| 6,272,108 B1 | * | 8/2001 | Chapman .................. | 370/226 |
| 6,307,893 B1 | * | 10/2001 | Bremer et al. ............. | 375/296 |
| 6,310,909 B1 | * | 10/2001 | Jones ..................... | 375/220 |

* cited by examiner

Primary Examiner—Don N. Vo
Assistant Examiner—Dung X Nguyen
(74) Attorney, Agent, or Firm—Pedro P. Hernandez; W. James Brady, III; Frederick J. Telecky, Jr.

(57) ABSTRACT

A method and apparatus for producing a variable rate precoded signal are presented in which a variable rate encoder receives a rate control signal and a data signal and generates a constellation size signal and data symbols. The data symbols and constellation size signal can be used by a precoder to produce a variable rate precoded signal. The precoder can be a Tomlinson/Harashima-Miyakawa precoder which uses the constellation size signal as part of the quantization process. The system can also be used to generate a variable rate modulation encoded signal. The invention provides the ability to create a variable rate signal which can be precoded and to which error correcting codes can be readily applied.

11 Claims, 7 Drawing Sheets

| C-SIZE$_j$ | SCHEDULE VALUE S$_j$ | QUANTIZER M | CONSTELLATION SIZE |
|---|---|---|---|
| 0 | 1 | 8 | 4 |
| 1 | 2 | 16 | 8 |
| 2 | 3 | 24 | 12 |
| 3 | 4 | 32 | 16 |
| 4 | 5 | 40 | 20 |
| 5 | 6 | 48 | 24 |
| 6 | 7 | 56 | 28 |
| 7 | 8 | 64 | 32 |

| LABEL | POINT | LABEL | POINT |
|---|---|---|---|
| 00000 | 1 | 00011 | -1 |
| 00001 | 3 | 00010 | -3 |
| 00110 | 5 | 00101 | -5 |
| 00111 | 7 | 00100 | -7 |
| 01000 | 9 | 01011 | -9 |
| 01001 | 11 | 01010 | -11 |
| 01110 | 13 | 01101 | -13 |
| 01111 | 15 | 01100 | -15 |
| 10000 | 17 | 10011 | -17 |
| 10001 | 19 | 10010 | -19 |
| 10110 | 21 | 10101 | -21 |
| 10111 | 23 | 10100 | -23 |
| 11000 | 25 | 11011 | -25 |
| 11001 | 27 | 11010 | -27 |
| 11110 | 29 | 11101 | -29 |
| 11111 | 31 | 11100 | -31 |

FIG. 6

| CHANNELS (DS0) 700 | NUMBER OF MAPPED BITS 710 | $RATE_b$ (BITS PER SYMBOL) 720 | $RATE_s$ (SYMBOLS PER SECOND) 730 | PAM 740 | SCHEDULE 750 |
|---|---|---|---|---|---|
| 12 | 4 | 1.500 | 522667 | 4/8 | 21212121 |
| 13 | 5 | 1.625 | 521846 | 4/8 | 21221221 |
| 14 | 6 | 1.750 | 521143 | 4/8 | 22212221 |
| 15 | 7 | 1.875 | 520533 | 4/8 | 22222221 |
| 16 | 8 | 2.000 | 520000 | 8 | 22222222 |
| 17 | 9 | 2.125 | 519529 | 8/12 | 22322232 |
| 18 | 10 | 2.250 | 519111 | 8/12 | 32323232 |
| 19 | 11 | 2.375 | 518737 | 8/12 | 33323332 |
| 20 | 12 | 2.500 | 518400 | 8/12 | 33333332 |
| 21 | 13 | 2.625 | 518095 | 12/16 | 33333343 |
| 22 | 14 | 2.750 | 517818 | 12/16 | 43434343 |
| 23 | 15 | 2.875 | 517565 | 12/16 | 44434443 |
| 24 | 16 | 3.000 | 517333 | 16 | 44444444 |
| 25 | 17 | 3.125 | 517120 | 16/20 | 54545454 |
| 26 | 18 | 3.250 | 516923 | 16/20 | 55555554 |
| 27 | 19 | 3.375 | 516741 | 20/24 | 55655565 |
| 28 | 20 | 3.500 | 516571 | 20/24 | 66656665 |
| 29 | 21 | 3.625 | 516414 | 24/28 | 66766676 |
| 30 | 22 | 3.750 | 516267 | 24/28 | 77767776 |
| 31 | 23 | 3.875 | 516129 | 28/32 | 78778787 |
| 32 | 24 | 4.000 | 516000 | 32 | 88888888 |

*FIG. 7A*

| CHANNELS (DS0) 700 | NUMBER OF MAPPED BITS 710 | $RATE_b$ (BITS PER SYMBOL) 720 | $RATE_s$ (SYMBOLS PER SECOND) 730 |
|---|---|---|---|
| 16 | 4 | 1.500 | 693.3 |
| 17 | 5 | 1.625 | 679.4 |
| 18 | 6 | 1.750 | 667.4 |
| 19 | 6 | 1.750 | 704.0 |
| 20 | 7 | 1.875 | 691.2 |
| 21 | 8 | 2.000 | 680.0 |
| 22 | 9 | 2.125 | 670.1 |
| 23 | 9 | 2.125 | 700.2 |
| 24 | 10 | 2.250 | 689.8 |
| 25 | 11 | 2.375 | 680.4 |
| 26 | 12 | 2.500 | 672.0 |
| 27 | 12 | 2.500 | 697.6 |
| 28 | 13 | 2.625 | 688.8 |
| 29 | 14 | 2.750 | 680.7 |
| 30 | 15 | 2.875 | 673.4 |
| 31 | 15 | 2.875 | 695.7 |
| 32 | 16 | 3.000 | 688.0 |
| 33 | 17 | 3.125 | 681.0 |
| 34 | 17 | 3.125 | 701.4 |
| 35 | 18 | 3.250 | 694.2 |
| 36 | 19 | 3.375 | 687.4 |
| 37 | 20 | 3.500 | 681.1 |
| 38 | 20 | 3.500 | 699.4 |
| 39 | 21 | 3.625 | 693.0 |
| 40 | 22 | 3.750 | 686.9 |
| 41 | 23 | 3.875 | 681.3 |
| 42 | 23 | 3.875 | 697.8 |

*FIG. 7B*

VARIABLE RATE CONSTELLATION PRECODING

BACKGROUND OF THE INVENTION

Communications systems are frequently required to support varying data rates, and can do so using a variety of variable data rate transmission techniques. In many communications channels, intersymbol interference (ISI) is present and results in degradation of the received signal.

Almost all communications channels are noisy, or have loss such that the received signal has a low signal to noise ratio (SNR). One mechanism for dealing with noise in the communications channel is to use error control coding techniques in conjunction with higher order modulation formats to increase the throughput of the channel without increasing the power of the transmitted signal. Varying the transmission rate can require changes in the overall coding used.

One method for dealing with ISI is to use a decision feedback equalizer (DFE) which uses past decisions from a slicer to estimate an ISI component which can be subtracted from the signal. However, such methods suffer from the fact that errors in the detection process will propagate in the feedback process. This problem is especially acute in coded systems since the effects of errors will have a detrimental effect on the soft decision information of the receiver. In addition to this problem, since the detector is within a feedback loop, in a coded system the redundancy of the Forward Error Control (FEC) cannot be effectively exploited to improve the performance of the DFE.

One technique for dealing with ISI and for overcoming the above mentioned problems is to use Tomlinson/Harashima-Miyakawa preceding, which in effect moves the decision feedback equalizer function to the transmitter.

However, the techniques described by Tomlinson/Harashima-Miyakawa do not directly apply to variable rate systems since the transmitted signal constellation is fixed.

For the foregoing reasons, there is a need for a preceding system allows rate control while maintaining the desirable properties of Tomlinson/Harashima-Miyakawa preceding, as well supporting the use of other preceding techniques.

SUMMARY OF THE INVENTION

The present invention provides a method and apparatus for producing a variable rate precoded signal in which a variable rate mapper receives a rate control signal and a data signal and generates a sequence of constellation size representative values based on the rate control signal, in addition to producing a series of symbols representing the input data. The constellation size representative values are transmitted to a precoder, and the symbols are mapped to a modulation symbol to produce a modulated sequence of symbols. The precoder makes use of the sequence of constellation size representative values in conjunction with the modulated sequence of symbols to produce a variable rate precoded signal.

The precoder can be a Tomlinson/Harashima-Miyakawa precoder or other type of preceding circuit. A quantizer may be used as part of the preceding process and constrains the value of the output.

The invention can be used to map data blocks onto constellations of varying size by using the rate control signal and the data signal in the variable rate mapper to generate a sequence of symbols in which each symbol value is bounded by a corresponding value in a constellation size representative signal which is generated from the rate control signal.

In a preferred embodiment, the constellation size representative values are equal to a schedule signal minus one, where the schedule signal determines the range of a symbol.

The present invention can also be used to generate a variable rate modulation encoded signal. Bits from a data signal are divided into a first block of bits and a second block of bits, with the first block of bits passing through a variable rate mapper which generates a sequence of symbols and a sequence of constellation size representative values, and the second block of bits passing through an encoder which generates an encoded block of bits.

The two blocks of bits are used in a mapping process in which each composite set of bits is mapped to a constellation point. In a preferred embodiment, the bits from the encoder conceptually represent the least significant bits of the signal to be transmitted, while the bits from the variable rate mapper conceptually represent the most significant bits of the signal to be transmitted.

An advantage of the present invention is that it can be utilized to map data blocks onto constellations of varying size, as well as to support the use of Tomlinson/Harashima-Miyakawa preceding in a variable data rate system.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 6 shows a constellation labeling table with trellis coding;

FIGS. 7A and 7B show tables with Multi-rate Digital Subscriber Line (MDSL) parameters to support different data rates.

DETAILED DESCRIPTION OF THE INVENTION

Figure 1:
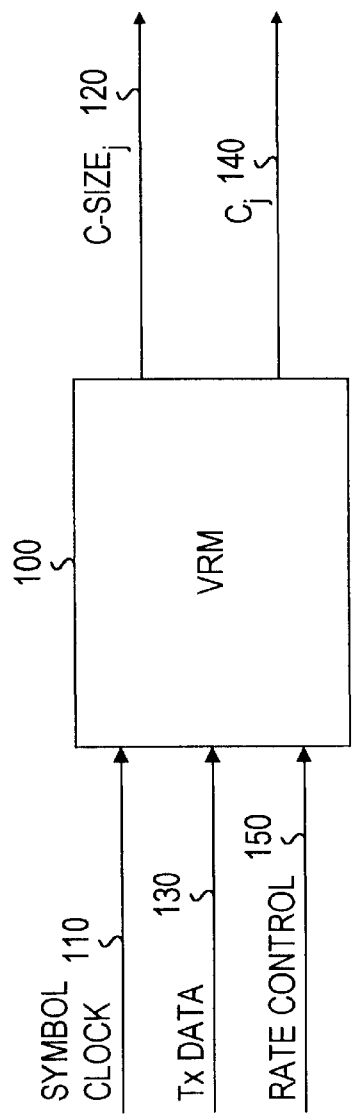
FIG. 1 shows a variable rate mapper.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 7 in particular, the method and apparatus of the present invention is disclosed.

FIG. 1 shows a variable rate mapper (VRM) 100. VRM 100 allows mapping of data blocks onto constellations of varying size. In a preferred embodiment, VRM 100 translates a block of k bits into a block length n of transmission symbols to achieve a desired data rate. In its operation, VRM

100 maps a fixed number, k, of bits of the transmit data stream 130 onto a sequence of n symbols $C_j$ 140, with j=1,2, ... n. The range of the symbols $C_j$ 140 is determined by a rate control 150. Rate control 150 can be a schedule signal represented by $\{S_1, S_2, \ldots, S_n\}$, which is a vector of length n with each component at position j, $S_j$, describing the range of symbol $C_j$ 140: $0 \leq C_j < S_j$. The schedule value $S_j$ determines the range of symbol $C_j$ 140. The data stream is clocked at the input of VRM 100 at a rate k/n of the transmission symbol rate while the output is clocked at the symbol rate. Timing signals for VRM 100 are provided by symbol clock 110.

C-size$_j$ 120 represents the range of values that symbol $C_j$ 140 can take; it is related to the component $S_j$ on the schedule vector by the relation $S_j$=C-size$_j$+1. The value of C-size$_j$ 120 determines the constellation size where symbol $C_j$ 140 is to be mapped in. The relationship between C-size$_j$ 120 and the constellation size will be described with respect to FIG. 3B.

Figure 2:
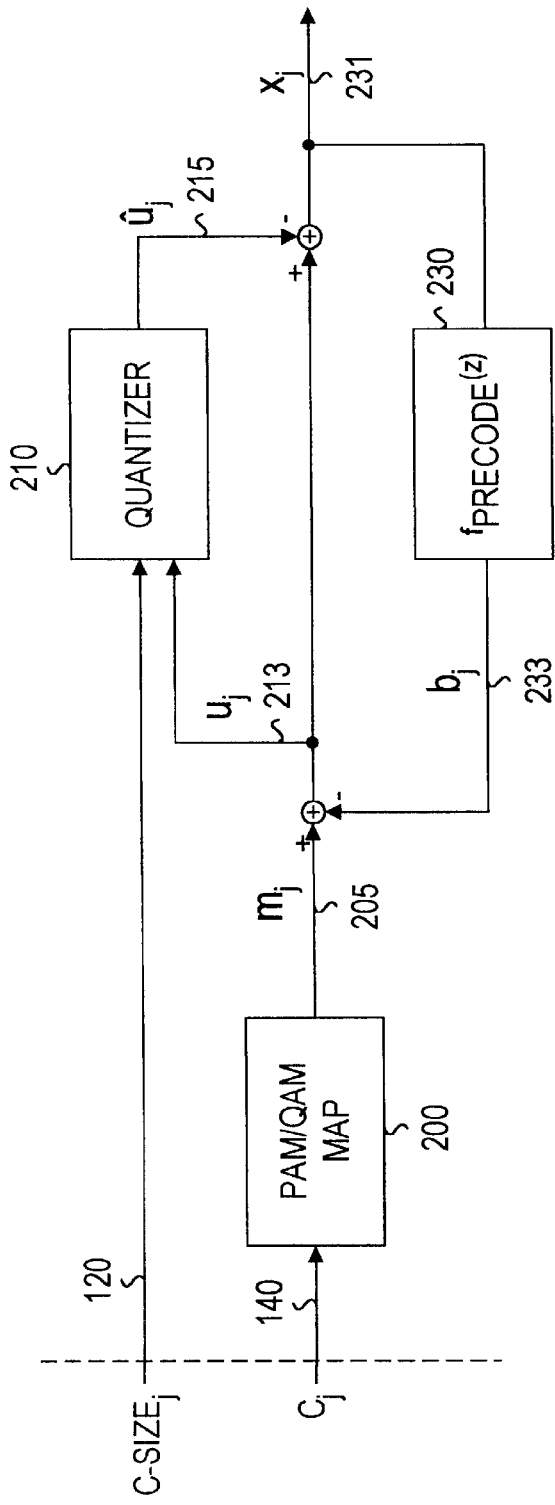
FIG. 2 shows a precoder function.

FIG. 2 shows a variable rate constellation precoder (VRCP) function used in a preferred embodiment. VRCP is an extension of the Tomlinson/Harashima-Miyakawa preceding (THMP) method. The THMP method is well known to those skilled in the art. In a preferred embodiment, the quantizer function is changed dynamically at both the transmitter and the receiver, in synchronization with the time varying constellation. As shown in FIG. 2, the VRCP precoder includes a signal mapping function, a quantizer function and a filtering function.

Other precoders can be used to perform the basic function of spectral shaping and are known to those skilled in the art. By transmitting the C-size$_j$ 120 and mapped symbols generated from signal $C_j$ 140 to a preceding unit, the time dependent mapping information is used by the precoder to produce a precoded variable rate signal.

In a preferred embodiment, as illustrated in FIG. 2, PAM/QAM MAP 200 maps the signal $C_j$ 140 output by VRM 100 into a PAM or QAM constellation. MAP 200 can be part of VRM 100 or distinct from VRM 100 as shown in FIG. 2. The channel input $x_j$ 231 is re-injected to the preceding function input through a preceding filter 230 present in the feedback loop. The output of the preceding filter 230, $b_j$ 233, is subtracted from the constellation point $m_j$ 205 and the resulting signal $u_j$ 213 is input to a quantizer function 210, which will be described in accordance with FIG. 3. Quantizer function 210 quantifies u; 213 according to the size of $C_j$ 140. The output of the quantizer function 210 $û_j$ 215 is subtracted from $u_j$ 213 for transmission over the channel.

The preceding function is based on an estimate of the channel transfer function, which can be obtained by performing channel measurements at the receiving end and sending the result of the channel estimation back to the transmitting end. Other channel estimation methods can be used and are known to those skilled in the art.

Figures 3A, 3B:
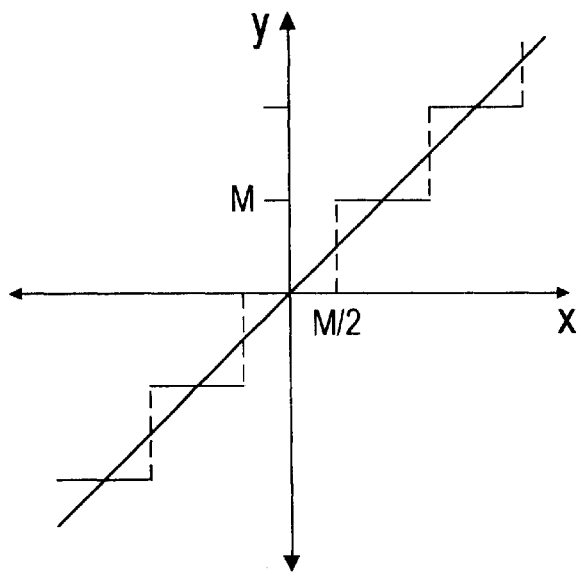
FIGS. 3A and 3B illustrate a precoder quantizer function.

FIGS. 3A and 3B show the VRCP quantizer function 210 and the quantizer control table, respectively. The VRCP quantizer function 210 is a modulo quantizer that folds back the signal to ensure that the transmitted signal is bounded. As shown in FIG. 3A, the quantizer function outputs discrete values in multiples of M where M/2 is the one-dimensional size of the constellation in use.

FIG. 3B shows the control table for the quantizer 210. The table shows the correspondence between C-size$_j$ 120, the schedule $S_j$ and the value of M, which is related to the size of the constellation from which $m_j$ 205 is obtained as mentioned previously.

Figure 4:
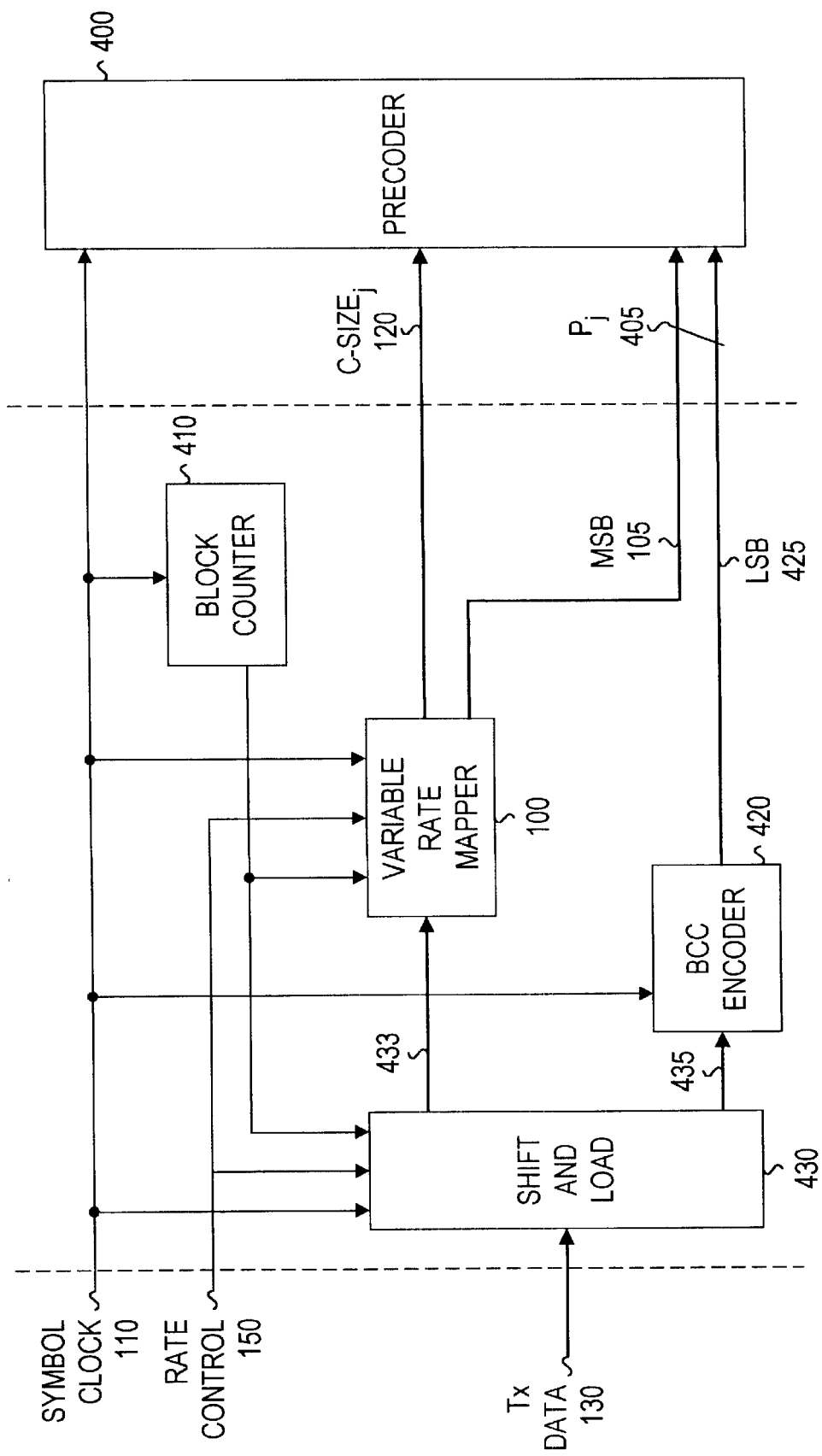
FIG. 4 illustrates an encoder function with trellis coding.

FIG. 4 shows a block diagram for an encoder which is compatible with a coded modulation scheme. Coded modulation is a combination of modulation and coding, and can include trellis coded modulation or other schemes well known to those skilled in the art. The shift and load module 430 takes at its inputs the information data and the control signals and outputs two streams of information data represented as stream 433 and stream 435. Stream 433 is presented to the VRM 100 while stream 435 is encoded with a binary convolutional code (BCC) at BCC encoder 420. The output of the BCC encoder 420 represents the least significant bits (LSBs) of the constellation labeling of the coded modulation. The output of the BCC encoder 420, LSB signal 425 and the output of VRM 100, representing the most significant bits (MSBs) and producing MSB signal 105, are combined to form a constellation label $P_j$ 405.

In a preferred embodiment, a block counter 410 is used for synchronization purposes in the shift and load module 430. The count is performed from the symbol clock 110.

Precoder 400 applies the preceding function described in accordance with FIG. 2. In a preferred embodiment, the constellation size, at a given instant in time, is chosen so that the quantizer function 210 maps all the points in a given partition, inherent to trellis coding, into the same partition.

A mapping of the constellation label $P_j$ 405 into a 32-PAM constellation is illustrated in the table of FIG. 6. In this embodiment, the two LSBs are the output of a BCC encoder 420 and the three MSBs are the outputs of the VRM 100.

The present invention can be applied to multi-rate digital subscriber loop (MDSL) systems, which are an extension of the High Speed Digital Subscriber Line 2 (HDSL-2) standard which supports multiple data rates. In a preferred embodiment of MDSL, a rate ½ binary convolutional code is used to code the 2 LSBs of the PAM constellation. The tables of FIGS. 7A and 7B show the MDSL parameters obtained from the base rates T1 and E1, respectively. The term T1 is used to describe a digital carrier facility used to transmit digital signals over telephone lines. T1 rate is the physical line transmission specification for DS1 formatted digital signals, which are the multiplex of 24 voice channels in one time division multiplexed channel. A voice channel operates at 64 kbps and is considered in the digital multiplex hierarchy as a DS0 channel. The T1 rate of 1.544 Mbps results from a payload of 24 DS0s plus framing and overhead. The T1 standard is generally used in North America while the E1 rate is generally adopted in Europe and Africa. The E1 rate is the multiplex of 32 DS0 channels plus framing and overhead for an overall rate of 2.048 Mbps.

In HDSL-2, sixteen information bits are encoded into eight 2-bit symbols and a third bit equal to 0 is used as MSB to obtain 3-bit symbols. The 3-bit symbols are mapped into a 16-PAM constellation after using the rate ½ BCC. The basic T1 information rate of 24*64+16=1552 kbps gives a symbol rate of 517.33 kbauds/sec. In order to support different data rates of the form k*64+16 kbps, the symbol rate, $R_s$, and the number of bits per symbol, $R_b$, can be varied. For a constant symbol rate, a number of bits per symbol of the form n*3/97 can be used. However, allowing a small variation in the symbol rate is also possible. Examples of number of bits per symbol for various data rates are listed in FIG. 7A and FIG. 7B. In these tables, the symbol rate is varied over a small range.

In FIG. 7A, for each number of DS0 channels listed in the DS0 channels column 700, there corresponds a set of parameters to achieve a desired data rate, R, which is of the form R=$R_s$*$R_b$. The basic data rate considered in the table of FIG. 7A is the T1 rate. The number of mapped bits column 710 contains the number of information bits used on the 8-symbol vector output by the VRM 100. The schedule column 750 describes the range of the components of the 8-symbol vector while the PAM constellation size column 740 contains the sizes of the constellation used for the components of the 8-symbol vector. The size of the constellation takes into account the presence of the binary encoder.

In a preferred embodiment, the symbol rate is varied slightly from the basic rate of 517,33 kbauds/sec as illustrated by its values in the symbol rate column 730. The number of bits per symbol for each data rate is listed in the bits per symbol column 720.

The table of FIG. 7B shows the value of the parameters that can be used to accommodate different data rates from a basic E1 rate, which has 32 DS0 channels.

Figure 5:
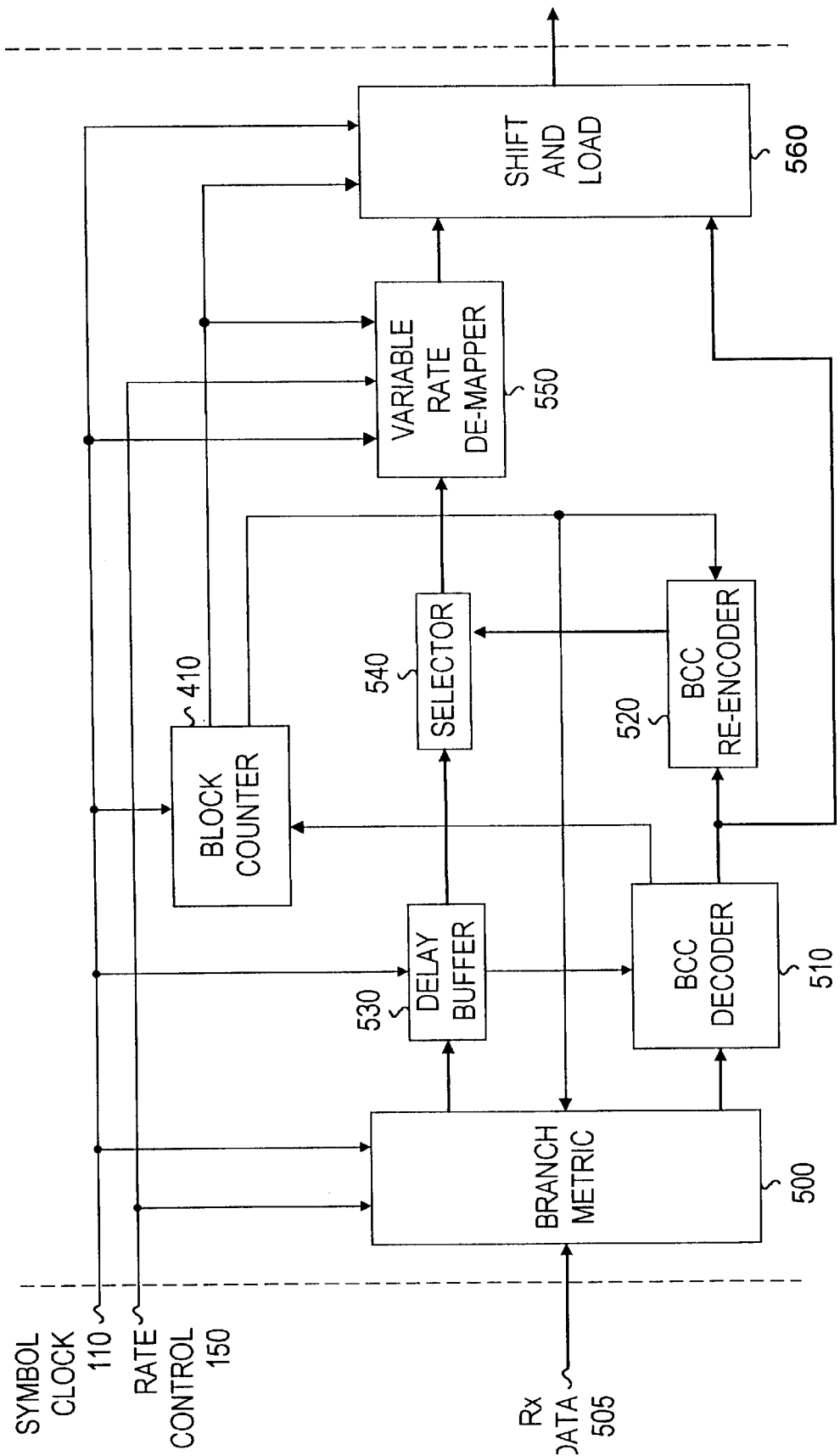
FIG. 5 illustrates a decoder function with trellis coding.

FIG. 5 is the block diagram of a decoding function which can be used in conjunction with the encoding scheme shown in FIG. 4. In this embodiment, the rate control 150 is known to the decoder and is used along with the symbol clock 110 to synchronize the various operations of the decoder.

As illustrated in FIG. 5, branch metric calculator module 500 computes from its soft inputs, i.e., receive data stream 505, the branch metrics of all the transitions of the trellis code. Branch metric computation of a trellis code is well known to those skilled in the art. The branch metric calculator module 500 performs a subset decoding to map the received data stream 505 into the signal constellation used by the encoder. The branch metric calculator module 500 produces soft decisions, which are the estimates of the signal points transmitted along with their corresponding branch metric. An example of signal points and their associated labeling is presented in the table of FIG. 6.

In a preferred embodiment, the estimates of the signal points are presented to a delay buffer 530. The delay buffer 530 delays the input signal to match the processing delay of BCC decoder 510. BCC decoder 510 decodes the signal received from the branch metric calculator module 500 to recover the stream 435. BCC decoder 510 is dual to the BCC encoder 420 and can run the Viterbi algorithm or any other algorithm for decoding a binary convolutional code.

A BCC re-encoder 520 re-encodes the decoded signal. In a preferred embodiment, BCC re-encoder 520 is similar to BCC encoder 420. The output of the BCC re-encoder 520, which is the LSBs of the label of the selected signal point, is used by a selector 540 to take a hard decision on the MSBs of the label of the selected signal point. A variable rate de-mapper 550 reverses the operation of the variable rate mapper 100 to produce an estimate of the stream 433. Variable rate de-mapper 550 functions under control of the rate control 150 and the block counter 410. The symbol clock 110 also provides synchronization means to the variable rate de-mapper 550.

The shift and load module 560 combines the output of the variable rate de-mapper 550 and the output of the BCC decoder 510 to produce a data stream representing an estimate of the transmit data stream 130.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. In a communication system, a method of producing a variable rate precoded signal, said method comprising the steps of:

(a) receiving a rate control signal at a variable rate mapper;

(b) receiving a data signal at said variable rate mapper;

(c) generating a sequence of constellation size representative values in said variable rate mapper based on said rate control signal;

(d) generating a sequence of symbols in said variable rate mapper from said data signal wherein each symbol value in said sequence of symbols is bounded by a corresponding value in said sequence of constellation size representative values;

(e) transmitting said sequence of constellation size representative values to a precoder;

(f) mapping said sequence of symbols to a modulation symbol to produce a modulated sequence of symbols;

(g) transmitting said modulated sequence of symbols to said precoder; and (h) preceding said modulated sequence of symbols in said precoder wherein said precoder makes use of said sequence of constellation size representative values to produce a variable rate precoded signal.

2. A method in accordance with claim 1 wherein said preceding is based on the use of Tomlinson/Harashima-Miyakawa precoding.

3. A method in accordance with claim 1 wherein said precoder performs a quantization function which is dynamically controlled by said constellation size representative values.

4. A method in accordance with claim 1, wherein said step of generating a sequence of symbols from said data signal uses an error control coding scheme.

5. A method in accordance with claim 4 wherein said error control coding scheme uses at least one of a binary convolutional code and trellis coded modulation.

6. In a communication system, a method of mapping data blocks onto constellations of time varying size, said method comprising the steps of:

(a) receiving a rate control signal at a variable rate mapper;

(b) receiving a data signal at said variable rate mapper;

(c) generating a sequence of constellation size representative values in said variable rate mapper based on said rate control signal, and
        wherein said constellation size representative values are equal to a schedule signal minus 1; and (d) generating a sequence of symbols in said variable rate mapper from said data signal wherein each symbol value in said sequence of symbols is bounded by a corresponding value in said sequence of constellation size representative values.

7. A method in accordance with claim 6 wherein the schedule signal determines the range of a symbol.

8. In a communication system, a method for generating a variable rate modulation encoded signal, said method comprising the steps of:

(a) receiving a rate control signal at a variable rate mapper;

(b) receiving a first block of bits from a data signal at said variable rate mapper;

(c) generating a sequence of constellation size representative values in said variable rate mapper based on said rate control signal;

(d) generating a sequence of symbols in said variable rate mapper from said first block of bits wherein each symbol value in said sequence of symbols is bounded by a corresponding value in said sequence of constellation size representative values;

(e) receiving a second block of bits from a data signal at an encoder;

(f) generating an encoded signal from said second block of bits in said encoder.

9. A method in accordance with claim 8 wherein the sequence of symbols produced in said variable rate mapper represents the most significant bits of a constellation point.

10. A method in accordance with claim 8 wherein the sequence of symbols produced in said encoder represents the least significant bits of a constellation point.

11. A method in accordance with claim 8 further comprising the steps of:

(g) combining said encoded signal with said sequence of symbols from said variable rate mapper, wherein said encoded signal is used to form the least significant bits of an encoded variable rate signal and wherein said sequence of symbols from said variable rate mapper is used to form the most significant bits of said encoded variable rate signal; and (h) mapping said encoded variable rate signal into a constellation point.

* * * * *